(12) United States Patent
Yen

(10) Patent No.: US 7,467,407 B2
(45) Date of Patent: Dec. 16, 2008

(54) LOW PROFILE OF SECURITY USB DIGITAL DATA PROCESSING DEVICE

(75) Inventor: Sheng Shun Yen, Taipei (TW)

(73) Assignee: Power Quotient International Co., Ltd, Chung Ho (TW)

( * ) Notice: Subject to any disclaimer, the term of this patent is extended or adjusted under 35 U.S.C. 154(b) by 657 days.

(21) Appl. No.: 10/760,392

(22) Filed: Jan. 21, 2004

(65) Prior Publication Data
US 2005/0144472 A1    Jun. 30, 2005

(30) Foreign Application Priority Data
Dec. 24, 2003    (CN)    ............ 2003 1 0124422

(51) Int. Cl.
*G06F 12/14*    (2006.01)
(52) U.S. Cl. ............ 726/20; 726/9; 711/163; 711/164
(58) Field of Classification Search ............ 726/9, 726/20; 711/163, 164
See application file for complete search history.

(56) References Cited

U.S. PATENT DOCUMENTS

| | | | | |
|---|---|---|---|---|
| 5,835,594 | A * | 11/1998 | Albrecht et al. | 713/187 |
| 6,012,145 | A * | 1/2000 | Mathers et al. | 726/17 |
| 6,763,399 | B2 * | 7/2004 | Margalit et al. | 710/13 |
| 6,848,045 | B2 * | 1/2005 | Long et al. | 726/20 |
| 6,880,054 | B2 * | 4/2005 | Cheng et al. | 711/164 |
| 6,904,493 | B2 * | 6/2005 | Chiao et al. | 711/103 |
| 7,039,759 | B2 * | 5/2006 | Cheng et al. | 711/115 |
| 7,168,092 | B2 * | 1/2007 | King et al. | 726/9 |
| 2003/0204735 | A1 * | 10/2003 | Schnitzmeier | 713/186 |
| 2006/0130128 | A1 * | 6/2006 | Gorancic et al. | 726/9 |

FOREIGN PATENT DOCUMENTS

WO    200055707 A1 *    9/2000

OTHER PUBLICATIONS

Schneier, Bruce. Applied Cryptography, 2nd Edition. © 1996 Bruce Schneier. Published by John Wiley & Sons Inc. pp. 30 and 52.*
"Lexar Media Keeps Data Safe With Extra Rugged Jumpdrive Secure" © 2003 Lexar Media Inc. http://www.lexar.com/newsroom/press/press_03_02_03d.html.*
Lexar Safe Guard User Guide. © 2003 Lexar Media Inc.*
Grevstad, Eric. "SanDisk Cruzer and M-Systems DiskOnKey Review" part 1: "21st Century Floppies" Published Aug. 20, 2002. http://www.hardwarecentral.com/hardwarecentral/reviews/article.php/12095_1449831_1.*

(Continued)

*Primary Examiner*—KimYen Vu
*Assistant Examiner*—Thomas Gyorfi
(74) *Attorney, Agent, or Firm*—Ming Chow; Sinorica, LLC

(57) ABSTRACT

The present invention discloses a USB memory card such as an intelligent stick, of which a control of data encryption is included to enhance data security and meet the data security requirement. The USB memory card of this invention is applicable for the traditional smart card market, like as e-commerce, ID token in internet, as well as featuring a low system cost and a popular USB interface. The size of such USB memory card is small, easy-to-carry, and easy-to-use.

1 Claim, 4 Drawing Sheets

OTHER PUBLICATIONS

Grevstad, Eric. "SanDisk Cruzer and M-Systems DiskOnKey Review" part 2: "Side by Side" Published Aug. 20, 2002. http://www.hardwarecentral.com/hardwarecentral/reviews/article.php/12095_1449831_2.*

"Using Multilingual KeySafe™" © 2002 M-Systems Inc. (created Aug. 18, 2002, observed Dec. 7, 2002 by the Internet Archive) http://web.archive.org/web/20021207143127/http://www.diskonkey.com/drivers/KeySafe_readme_v2.1.pdf.*

Gillmor, Dan. "Flash Disks to Go". Published Aug. 5, 2002; © 2001-2002 SiliconValley.com http://web.archive.org/web/20030103092207/www.siliconvalley.com/mld/siliconvalley/business/columnists/dan_gillmor/ejournal/3804614.htm?template=contentModules/printstory.jsp.*

Unrein, Shane. "64MB SanDisk Cruzer-Flash USB Storage Device" Published Sep. 9, 2002; © 2002 Bjorn3d.com http://www.bjorn3d.com/read_pf.php?cID=48.*

Lyon, Jack. "C|Net Hardware: Mini Megabytes: USB flash drives" Published Aug. 13, 2002 http://web.archive.org/web/20021024005038/http://computers.cnet.com/hardware/0-1092-8-20256442-1.html.*

Ludlow, David. "Sony Micro Vault: Keep data away from prying eyes" Published Nov. 21, 2003 http://www.computing.co.uk/personal-computer-world/hardware/2044671/sony-micro-vault.*

"Trek Thumbdrive Secure: Small and Secure" © 2002 Trek 2000 International (observed Jun. 28, 2002 by Internet Archive) http://web.archive.org/web/20020628015802/www.thumbdrive.com/secure.htm.*

Trek TrekStor Secure User's Manual (Rev 1.2 Nov. 30, 2001) © 2001 Trek Technology Ltd. Available at http://web.archive.org/web/20021012082258/http://www.thumbdrive.com/tdsmanual.pdf.*

"Howstuffworks: Consumer Electronics Show 2002" © 2002 HowStuffWorks Inc. http://electronics.howstuffworks.com/ces2002.htm/printable.*

"USBDrive® Utility Instructions" Creation date of Jan. 23, 2003. Available at http://www.jmtekstore.com/support/driversal/Users_guide.pdf.*

* cited by examiner

LOW PROFILE OF SECURITY USB DIGITAL DATA PROCESSING DEVICE

FIELD OF THE INVENTION

The present invention relates to a data security system using common USB interface technology and intelligent stick structure to establish a data security level as well as the one of smart cards.

BACKGROUND OF THE INVENTION

Most memory cards and authentication cards used in the current financial area are composed of a smart card system. However, the cost of establishing such system is too high, and generally such system is not supported by personal computer systems and peripherals. Therefore, a USB security authentication device is created to overcome this shortcoming, but the size and thickness of the device is larger than a regular memory card and thus not easy to carry.

SUMMARY OF THE INVENTION

The present invention discloses a USB memory card such as an intelligent stick, of which a control of data computation is included to enhance the data security and meet the data security requirements. The USB memory card of the invention is applicable to the traditional smart card market as well as featuring a low system cost and a popular USB interface. The size of such USB memory card is compact, easy-to-carry, and easy-to-use.

As to the digital data processing equipment, overcoming the above shortcomings and providing a compatible computer interface to make the application more convenient and comply with user's operating habits are important topics.

In view of the description above, the inventor of this invention based on years of experience on computer product research and marketing to conduct researches and experiments to overcome the foregoing shortcomings, and finally invented the "A low profile of security USB digital data processing device" in accordance with this invention.

The primary objective of the present invention is to provide a security USB digital data processing device, of which a control of data encryption is included to enhance data security and meet data security requirements. The USB memory card of this invention is applicable to the traditional smart card market as well as featuring a low system cost and a popular USB interface. The size of such USB memory card is compact, easy-to-carry, and easy-to-use.

DETAILED DESCRIPTION OF THE PREFERRED EMBODIMENTS

To make it easier for our examiner to understand the objective of the invention, its structure, innovative features, and performance, we use a preferred embodiment together with the attached drawings for the detailed description of the invention.

Figure 1:
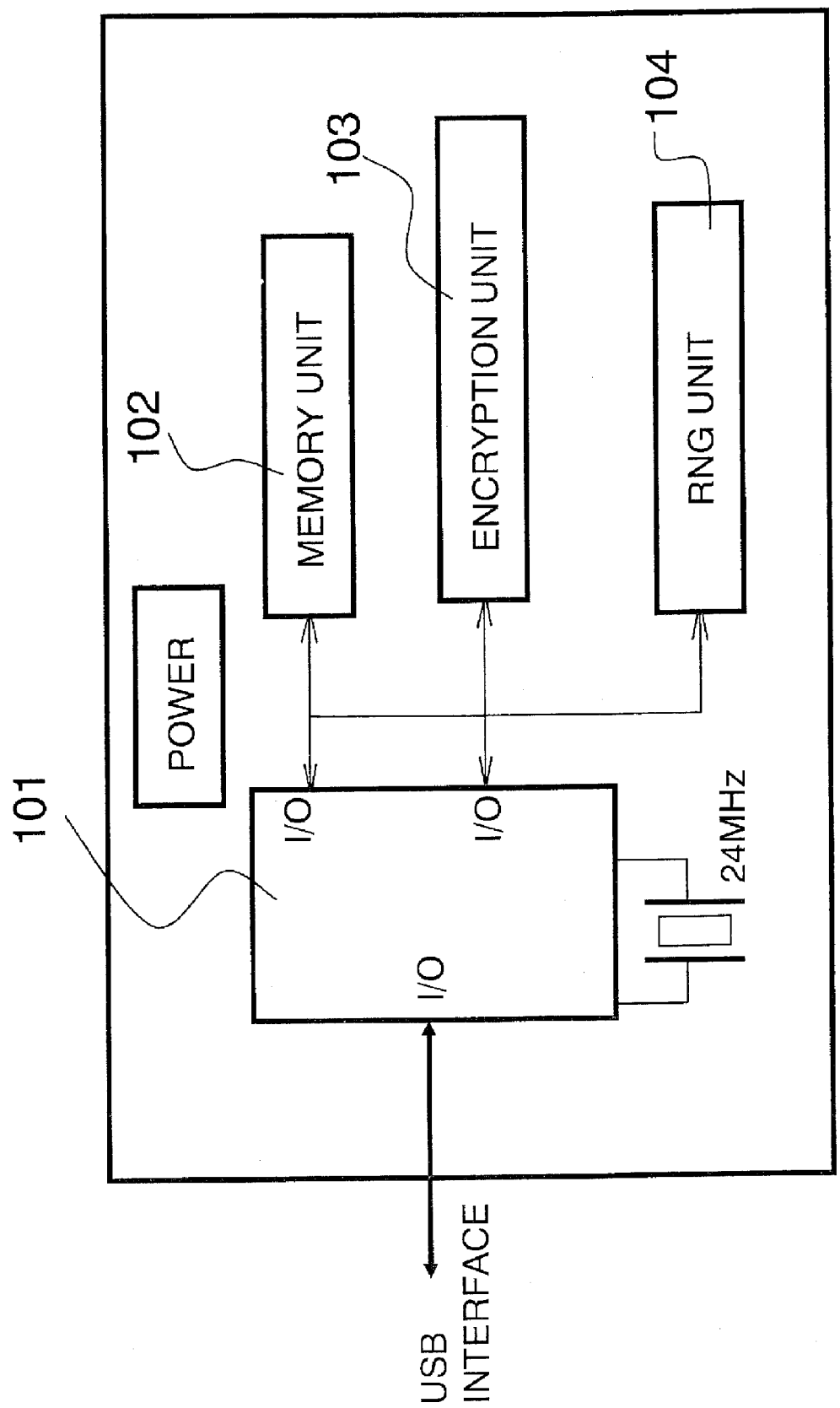
FIG. 1 is a system block diagram of the security USB digital data processing device of the present invention.

Please refer to FIG. 1 for the system block diagram of the present invention, which comprises a USB controller 101 for transmitting data, a memory unit 102 electrically coupled to a circuit of said USB controller 101 for storing data, and an encryption unit 103 electrically coupled to circuits of the USB controller 101 and memory unit 102. After a data is passed to the USB controller 101 and processed by the encryption unit 103 with a symmetric key algorithm such as DES, TDES, RC2, RC4, and RC5, etc. the data can be encrypted to be a cipher or decrypted from a cipher, and finally saved in the memory unit 102 or outputted to the external operating system.

To improve the data security level, an asymmetric key algorithm (or called as public key algorithm) is used to perform further security by encryption such as RSA, DSA, and ECC, etc. to meet the algorithm of PKI security system technology. If the power of the kernel of this encryption unit is enough, hash algorithm also can be achieved, like as MD2, MD5 or SHA, etc. A random number generator 104 is implemented into the system to facilitate and enhance the design of security. The random number generator 104 produces a random number as a key for the foregoing encryption. Such arrangement can further improve the data security.

To meet the requirements of the hardware operation as shown in FIG. 1, an appropriate application program interface (API) must be provided for system developers to call it and develop her security operating system.

Besides the capability of the hardware encryption, the design of this invention also focuses on dividing the memory unit into a plurality of blocks with different features. The types of blocks include general block, read only block, and reserved block. The general block is provided for end users to save, modify and read the data to or from this memory block, The read only block is provided for end users to read data, but does not allow end users to write, delete, or modify data unless the end user has gone through an authentication procedure such as entering a correct password. The reserved block does not allow general end users to read, write, modify, delete data, or even format the device or this memory block. The data in the reserved block is reserved for specific system service providers. By the foregoing application program interface (API), data can be accessed from the reserved block at a far end via internet, which can further improve the security level of the USB memory card of this invention. Such hardware feature of dividing the memory into blocks is not found in traditional smart cards yet.

Figure 2:
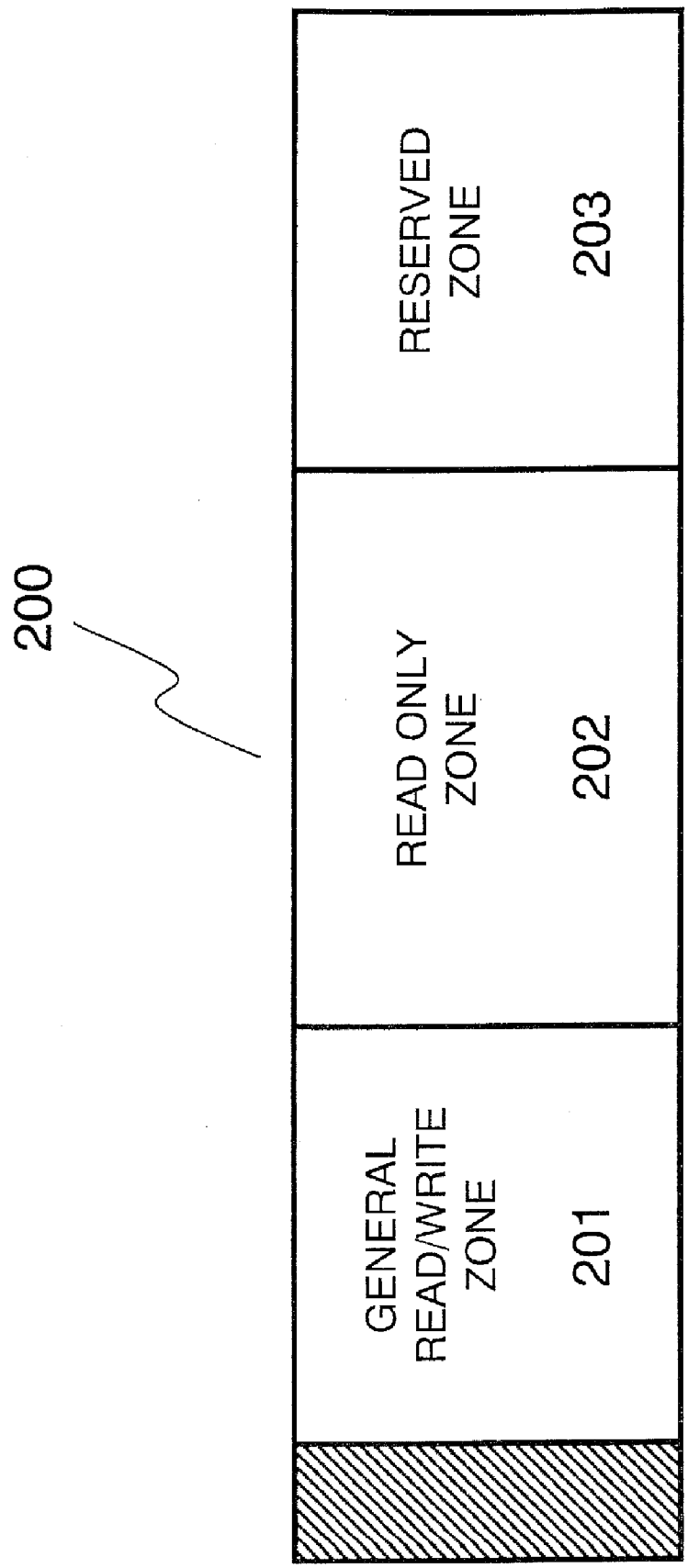
FIG. 2 is an illustrative diagram of the partition of the memory unit according to the present invention.

Please refer to FIG. 2 for the illustration of the division of a memory unit 200 of the present invention. The memory unit 200 is divided into a general block 201, a read only block 202, and a reserved block 203.

Figure 3:
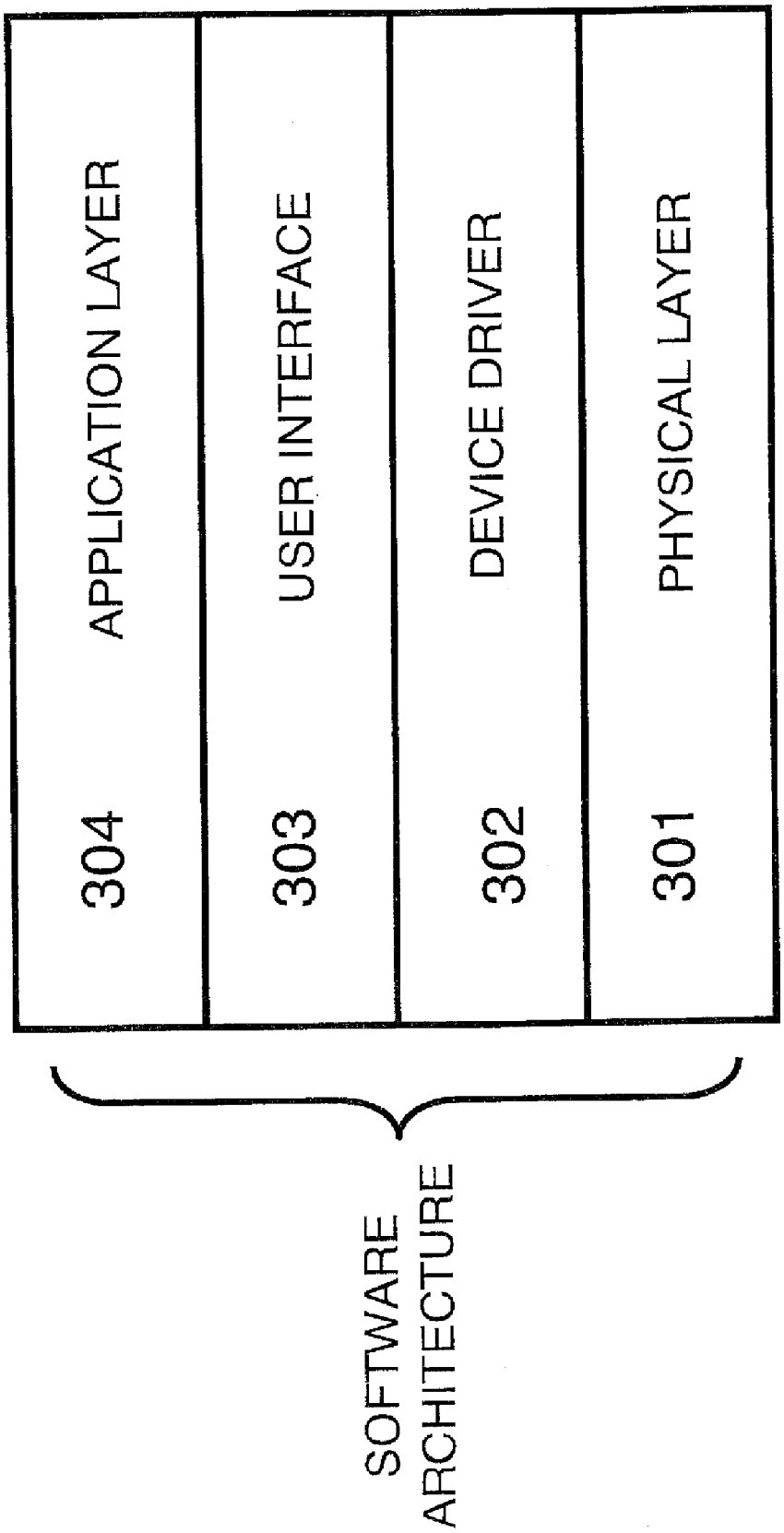
FIG. 3 is an illustrative diagram of the software architecture according to the present invention.

Please refer to FIG. 3 for the software architecture of the present invention. This software architecture includes a physical layer 301 which adopts an intelligent stick of a USB memory card for the hardware design, a driving layer 302 for calling the subroutine for the data processing between a host system and the physical layer and handling the request for processing the application at the upper layer to this device which could meet the Microsoft PC/SC specifications, a user interface layer 303 which could satisfy the PKCS#11 standard interface or Microsoft CryptoAPI interface specifications, and an application layer 304 which is the high-level application interface (API) providing programmers a familiar programming interface for the system development.

Figure 4:
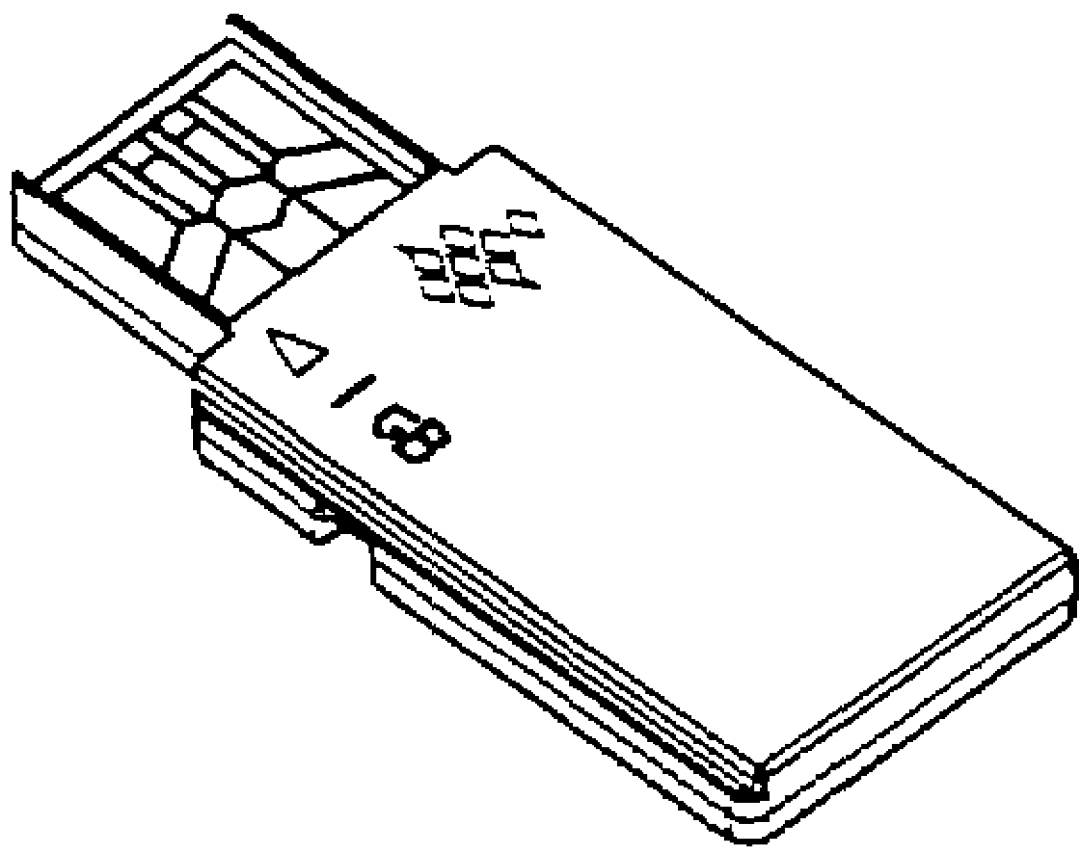
FIG. 4 is a perspective diagram of the security intelligent stick according to the present invention.

A low-cost, low profile, light, thin, short, and compact security USB memory device can be made according to the system block diagram of FIG. 1 and the software architecture as shown in FIG. 3. Further, an intelligent stick as shown in FIG. 4 can be used to commercialize the invention into a security intelligent stick.

By means of the design of the USB security operating system according to this invention, users do not need to purchase an expensive smart card reader, and thus greatly reducing costs as well as getting more convenience in PC platform. Further, the utilization of intelligent stick can reduce the size of the device to card form factor and need no adapter to transfer USB signal as connecting to a standard USB port thus bring us convenience and portability.

In summation of the above description, the present invention enhances the performance of the conventional structure, and further complies with the patent application requirements and is submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A USB digital data processing device with data security protections comprises, a random number generator;

an USB controller, wherein the USB controller receives data via interfaces from external operating systems;

an encryption unit, wherein the encryption unit receives the data from the USB controller and encrypts the data;

the encryption unit encrypts the data with a first level encryption by a first level symmetric algorithm wherein the symmetric algorithm is selected from the group consisting of DES, TDES, RC2, RC4, and RC5, and the first level symmetric algorithm encrypts the data in accordance with a random number generated by the random number generator;

in response to the first level encryption the encryption unit further encrypts the data encrypted by the first level encryption with a second level encryption, wherein the second level encryption implements a second level asymmetric algorithm selected from the group consisting of RSA, DSA, and ECC, and the second level asymmetric algorithm encrypts the data in accordance with a random number generated by the random number generator;

in response to the second level encryption the encryption unit further encrypts the data encrypted by the second level encryption with a third level encryption, wherein the third level encryption implements a hash algorithm selected from the group consisting of MD2, MD5, and SHA, and the third level encryption encrypts the data in accordance with a random number generated by the random number generator; and a memory unit wherein the memory unit stores the encrypted data by the encryption unit and the memory unit comprises a plurality of memory areas including general area, read-only area, and reserved area, wherein the general area receives and stores data from the external operating systems and transmits data to the external operating systems;

the read-only area stores data for modifications by the external operating system with an authentication; and the reserved area implements Internet Protocol for data transmissions via the Internet;

the memory unit stores operating software that implements protocols of physical layer, a driving layer, an user interface layer, and an application layer.

* * * * *